US012772075B2

(12) United States Patent
Fitzmaurice et al.

(10) Patent No.: US 12,772,075 B2
(45) Date of Patent: Oct. 20, 2026

(54) SYSTEM AND METHOD FOR DYNAMICALLY CONFIGURING AND ALLOCATING MOBILE WIRELESS NETWORK SERVICE RESOURCES

(71) Applicant: T-MOBILE INNOVATIONS LLC, Overland Park, KS (US)

(72) Inventors: Thomas C. Fitzmaurice, Indian Head Park, IL (US); Yeshaye Robeson, Deerfield, IL (US); Thomas Vicary, Roselle, IL (US); Anuradha Mandava, Lake Zurich, IL (US); Michele C. Resendez, Chicago, IL (US); Michael Sisto, Hoffman Estates, IL (US); Susan Earley, Bensenville, IL (US); Narothum Saxena, Hoffman Estates, IL (US); Michael S. Irizarry, Barrington Hills, IL (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 117 days.

(21) Appl. No.: 18/201,351

(22) Filed: May 24, 2023

(65) Prior Publication Data

US 2024/0397344 A1 Nov. 28, 2024

(51) Int. Cl.
*H04W 24/02* (2009.01)
*H04W 8/04* (2009.01)

(52) U.S. Cl.
CPC ............. *H04W 24/02* (2013.01); *H04W 8/04* (2013.01)

(58) Field of Classification Search
CPC ................................ H04W 24/02; H04W 8/04
See application file for complete search history.

(56) References Cited

U.S. PATENT DOCUMENTS

| | | | | |
|---|---|---|---|---|
| 9,113,321 | B1 * | 8/2015 | Wojcik | H04W 4/90 |
| 9,485,712 | B1 * | 11/2016 | Hoffner | H04W 52/0212 |
| 9,497,658 | B2 * | 11/2016 | Lientz | H04W 28/24 |
| 9,602,991 | B1 * | 3/2017 | Zhang | H04W 4/20 |
| 9,826,380 | B1 * | 11/2017 | Zait | H04M 15/63 |
| 10,863,525 | B1 * | 12/2020 | Vivanco | H04L 5/0032 |
| 2014/0370834 | A1 * | 12/2014 | Liu | H04W 4/16 455/404.1 |

(Continued)

*Primary Examiner* — Blake J Rubin
(74) *Attorney, Agent, or Firm* — SHOOK, HARDY & BACON L.L.P.; Elena K. McFarland

(57) ABSTRACT

A method carried out by an access management system is described that facilitates modifying a mobile wireless data network services profile for a subscriber. The access management system includes an event manager and a set of trigger event processors configured to process particular trigger event types of trigger event instances received by the access management system. A triggering event message is received that specifies: a triggering event type, and a subscriber identification corresponding to the subscriber. An event notification message, in accordance with the triggering event type, is forwarded to a target node of the set of trigger event processors. An action message is rendered, based on the event notification message. The action message specifies: a prescribed action, and the subscriber identifier. An updated profile configuration is provided for an account for implementation of an access limit placed on digital data services access in accordance with the updated profile configuration.

16 Claims, 6 Drawing Sheets

(56) References Cited

U.S. PATENT DOCUMENTS

| | | | | |
|---|---|---|---|---|
| 2015/0046301 | A1* | 2/2015 | Wuerch | G06Q 40/12<br>705/30 |
| 2015/0229584 | A1* | 8/2015 | Okamoto | H04W 28/0866<br>709/226 |
| 2017/0063721 | A1* | 3/2017 | McCarrick | G06F 16/00 |
| 2017/0201850 | A1* | 7/2017 | Raleigh | H04W 4/50 |
| 2018/0092112 | A1* | 3/2018 | Jung | H04W 72/566 |
| 2018/0198883 | A1* | 7/2018 | Vuornos | H04L 67/5651 |
| 2018/0270721 | A1* | 9/2018 | Cui | H04W 8/22 |
| 2018/0279199 | A1* | 9/2018 | Karakkad Kesavan Namboodiri | H04W 48/16 |
| 2019/0254118 | A1* | 8/2019 | Dao | H04L 67/141 |
| 2022/0182873 | A1* | 6/2022 | Anand | H04W 76/15 |

* cited by examiner

| Profile Name | Service Quality Band | Upload Maximum | Download Maximum | Video Access | Roaming Access | Hotspot Access |
|---|---|---|---|---|---|---|
| N0 | L1 | 100M | 4B | 1080p | | |
| N1 | L2 | 100M | 4B | 1080p | | |
| N2 | L4 | 100M | 100M | None | | |
| R0 | L6 | | | | None | |
| R1 | L6 | | | | 3Mbps | |
| R2 | L6 | | | | 1.5Mbps | |
| H0 | L1 | | | | | Unrestricted |
| H1 | L1 | | | | | 1.5MBPS Speed |
| H2 | L0 | | | | | Blocked |

FIG. 5

| Device Profiles | | Network Profiles | | | | | | | | |
|---|---|---|---|---|---|---|---|---|---|---|
| | | Special | On Network | | | Off Network/Roam | | | Hotspot | |
| Group | Experience Band | 5G | Base | Type 1 | Type 2 | Base | Type 1 | Type 2 | Base | Type 1 |
| A | 1 | Y | N0 | N1 | N2 | R0 | R1 | R2 | H0 | H1 |
| B | 2 | Y | N0 | N2 | N4 | R0 | R1 | R2 | H0 | H2 |
| C | 3 | N | N0 | N4 | | R0 | R2 | | H0 | H3 |
| D | 4 | N | N1 | N2 | N4 | R1 | R3 | R4 | H0 | H1 |
| E | 5 | N | N3 | N4 | N6 | R0 | R1 | | H0 | |
| F | 6 | N | N3 | N4 | N8 | R0 | R1 | R4 | H1 | H3 |

FIG. 6

SYSTEM AND METHOD FOR DYNAMICALLY CONFIGURING AND ALLOCATING MOBILE WIRELESS NETWORK SERVICE RESOURCES

TECHNOLOGICAL AREA

The present disclosure generally relates to providing mobile wireless communication network services. More particularly, the present disclosure is directed to dynamically allocating and/or configuring mobile wireless communication services to a variety of service subscriber classes under a variety of network operating conditions.

BACKGROUND OF THE INVENTION

Mobile Network Operators (MNOs) are challenged to meet needs of an increasingly demanding user base. One of the most important characteristics of successfully meeting user expectations is providing continuous access, even if degraded, under virtually any circumstances and regardless of geographic area.

It is known to adjust mobile wireless digital data service availability in response to an account status change. For example, a user account may consume an allotted quantity of digital data quantity for a given period (e.g. monthly digital data service). In such case, a user account may encounter a reduced data rate (including complete disconnection from digital data services). In such case, a specifically defined user account status change, for a single user account, is handled with a pre-defined change in mobile wireless digital data service level for the single user account.

However, in other instances, a radio access network or associated core network components may experience temporary conditions where digital data service demand exceeds current network digital data throughput capacity that can be provided by the MNO in a particular geographic region. Such data demand-capacity imbalance may arise due to any of a variety of conditions including: a special event (e.g. an event at a public facility/park), a natural disaster (e.g., hurricane, tornado, flooding, etc.), etc.

Thus, there is a need to effectively respond quickly and equitably to a variety of status changes in user account demand and/or network capacity affecting demand-supply balance.

Moreover, there is a need for an extensible platform supporting configuration and automated implementation of digital data service demand-service balancing policies to ensure that universal digital data service can be ensured, while also continuing to account for differences between statuses of distinct user accounts when assigning priority and/or bandwidth to user accounts in circumstances where total demand exceeds current (instantaneous) digital data services supply.

Mobile network operators struggle with allocating service levels (i.e. data rates and access priority) to user accounts of various types in the presence of highly variable network demand and/or data service capabilities, to prevent network blockage and optimized traffic patterns.

A comprehensive configuration and automation framework is needed that enable network engineers to express, with potentially a high level of detail, types of user accounts and digital data service demand-supply status change events, and define automated responses (triggered by the change events) by the mobile wireless digital data carrier service provider equipment to address/restore a desired demand-supply balance.

SUMMARY OF THE DISCLOSURE

Embodiments of the disclosure are directed to a method carried out by an access management system for modifying a mobile wireless data network services profile for a subscriber. The access management system includes an event manager and a set of trigger event processors configured to process particular trigger event types of trigger event instances received by the access management system.

The method includes receiving, by an event manager, a triggering event message, wherein the triggering event message specifies: a triggering event type, and a subscriber identification corresponding to the subscriber. The event manager, in accordance with the triggering event type, forwards an event notification message to a target node of the set of trigger event processors. The target node processing the event notification message, renders an action message that specifies: a prescribed action, and the subscriber identifier. A provisioning node, in accordance with the prescribed action and subscriber identifier, provides an updated profile configuration for an account associated with the subscriber identifier for implementation of an access limit placed on digital data services access in accordance with the updated profile configuration.

Other embodiments of the disclosure are directed to an access management system for modifying a mobile wireless data network services profile for a subscriber. The access management system includes at least one electronic processor element and a non-transitory computer readable medium including computer executable instructions that, when executed by the at least one electronic processor element, facilitates carrying out a method.

The method is carried out by an event manager and a set of trigger event processors configured to process particular trigger event types of trigger event instances received by the access management system. The method includes receiving, by an event manager, a triggering event message, wherein the triggering event message specifies: a triggering event type, and a subscriber identification corresponding to the subscriber. The event manager, in accordance with the triggering event type, forwards an event notification message to a target node of the set of trigger event processors. The target node processing the event notification message, renders an action message that specifies: a prescribed action, and the subscriber identifier. A provisioning node, in accordance with the prescribed action and subscriber identifier, provides an updated profile configuration for an account associated with the subscriber identifier for implementation of an access limit placed on digital data services access in accordance with the updated profile configuration.

BRIEF DESCRIPTION OF THE DRAWINGS

While the appended claims set forth the aspects of the present invention with particularity, the invention and its advantages are best understood from the following detailed description taken in conjunction with the accompanying drawings, of which:

FIG. 5 depicts an exemplary data structure comprising information maintained in a physical storage identifying network access level profiles and associated network service quality attributes in accordance with the disclosure; and FIG. 6 depicts an exemplary data structure comprising information maintained in a physical storage identifying, for a particular experience band, a set of network statuses and associated digital data service levels assigned to a user device of an identified group under the particular network statuses.

DETAILED DESCRIPTION OF ILLUSTRATIVE EXAMPLES

Figure 1:
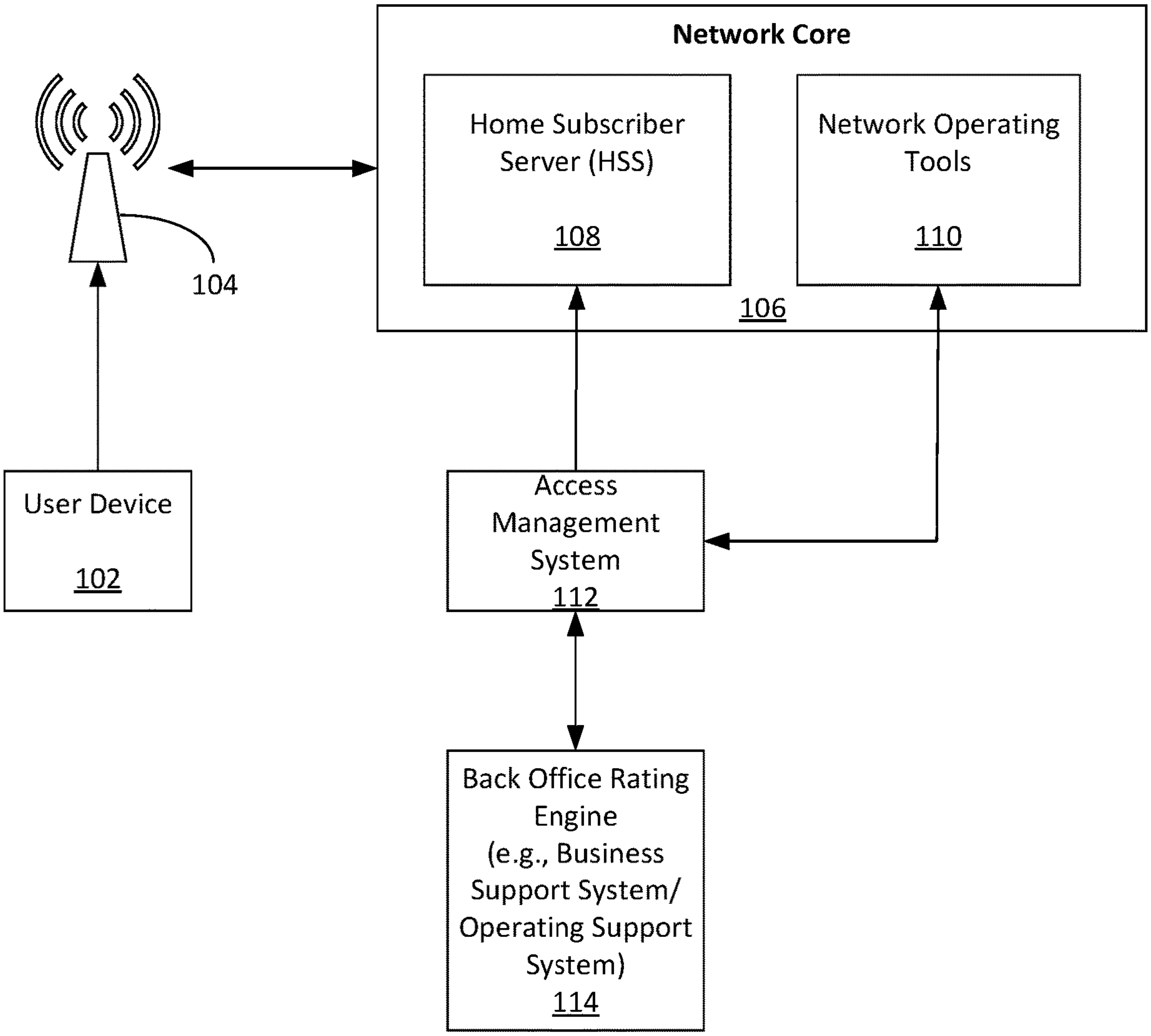
FIG. 1 is an illustrative schematic diagram of a mobile wireless network environment in accordance with the present disclosure.

The disclosure provided herein, of a dynamic digital data services access management system, addresses problems specifically faced in the particular area of providing needed/expected mobile wireless digital data services to a variety of user account classes in a variety of operating conditions. In particular, the present disclosure is directed to an extensible, highly configurable platform for supporting the configuration and real-time implementation of a dynamic allocation of user account type and status to respond to changes in mobile wireless digital data demand-supply balance. In accordance with the present disclosure the digital data services access management system responds to any of an unlimited variety of triggering events to re-allocate user account statuses (and associated priority and data rate limits) to address a current mobile wireless digital data services demand-supply imbalance. The scope of dynamic changes to account statuses itself is highly modifiable/changeable, such that re-allocation of user account statues can be carried out on any of a variety of user account types and geographic area definitions (i.e., on a RAN node, a local basis, a regional basis, a national basis, etc.) based upon the nature of the triggering event (e.g., a local public event, a weather emergency, a network component outage, etc.). Real-time responsive re-configuration of user account service levels (e.g., priority, data rate, etc.) ensures that any of a variety of changes in demand-supply balance can be addressed such that overall operation of the mobile wireless digital data network conforms to a pre-defined/configured policy comprising rules/requirements defining digital data service access by particular types of user accounts under particular mobile wireless data network service conditions.

The system and method of operation disclosed herein incorporates a digital data services allocation platform comprising several components (described herein below with reference to the drawings) to facilitate pre-configuration of user account ratings that are, in turn, used to establish priority and/or data rate limits to identified user account types and/or classes. The dynamic allocation of priority and/or data rate limits enables the system to carry out, on-demand/real-time, optimization of allocated digital data services and increase/reduce data bandwidth/usage to individual user accounts/devices based on device user types and status—and associated needs and data usage patterns.

The disclosed digital data services access management system takes into account types of requests being made by individual user devices (e.g. a video call, simple message service (SMS) messaging, etc.) as well as a current state of a network or components—such as a RAN interface node—thereof. The disclosed digital data services access management system is also capable of dynamically re-configuring in response to natural disasters and/or regional/national emergencies of varying geographic scope and time duration.

The disclosed digital data services access management system is configured to receive triggering event messages. Each triggering event message contains/provides a set of characterizing parameter values (e.g., event type, geographic location, severity level, etc.). The digital data services access management system is configured to digest the triggering event message and responsive reconfiguration operations are prescribed resulting in a dynamic reassignment of digital data service access statuses assigned to individual user devices in accordance with a pre-configured access level assignment criterion taking into consideration a type and/or status of the user account and/or device.

By way of a particular illustrative example, the digital data services access management system is configured to respond to an event message, which is digested to render a re-configuration trigger. In particular, a type of the event message is determined and pre-defined responsive user device-specific digital data service levels are assigned to user devices/accounts (e.g., based on business logic for a band, device users are assigned access service quality via a provisioning module). The resulting changes are passed to a home subscriber server (HSS) for use by the digital data services access management system in responding to a digital data service access requests.

Take for example a situation where a network component outage occurs during a natural disaster. In accordance with the present disclosure, an appropriate triggering event message is rendered by a triggering message source (e.g. a base station, a national weather service, etc.). The triggering event message identifies an actual/expected outage type and/or associated circumstances likely to result in an outage, and the event message further includes a set of parameter values indicating impacted network segments/components.

In another illustrative example, a back-office rating engine in the form of a business support system (BSS) and/or operating support system (OSS) informs the digital data services access management system that a set of subscriber accounts have exceeded their allocated digital data volume for a subscription period (e.g. month). The digital data services access management system, in accordance with a configurable response defined for a particular user account type and/or status, dynamically sets a current user profile description/status that results in a change to service quality attributes for requested digital data streaming service requests from the particular user account—as well as any other user accounts having similar statuses.

In accordance with the illustrative examples provided herein, the disclosed platform provides a highly configurable framework for assigning user accounts and associated devices a variety of types and statuses. Thereafter, a set of pre-configured policies are applied to the defined user types and statuses to assign/regulate network access granted to the user devices under a variety of network operational states (as indicated by triggering event messages received and processed by the system described herein). Service quality/level values are assigned by reference to network segment profiles. Each network segment profile, by way of example, specifies device network access levels for a set of distinct user account types/statuses for a variety of triggering events and/or network states. The network segment profile for a particular mobile wireless network portion and/or component can select among a variety of event and/or state-specific sets of network access level assignments.

Thus, in summary of the above, the platform described herein provides a framework for implementing a network segment digital data services provisioning system that specifies digital data services access on an individual user device basis by referencing both: (1) network segment profiles, and (2) a device experience band to which the individual user device (account) is assigned in order to provision the access request according to the assigned digital data service quality attributes stored in the network segment profiles for the particular device experience band assigned to the user device (account) requesting access to supported digital data services.

In response to a received event message, the system applies any associated network component and/or user account status changes to a set of pre-configured rules for selection of digital data service access rules and/or user account status assignment rules. The resulting changes are stored and form the basis for determining digital data service access for affected network segments and/or user devices. By way of example, a user device may be associated with a first responder. Upon receiving an event message that a particular network segment falls within a region of a natural disaster (e.g. a hurricane), the system assigns a highest priority and high digital data service level to the user device associated with the first responder that is determined to be within the geographical area of the natural disaster. The following is only a single specific example of an extensible set of pre-configurable responses to defined events and associated changes to user device-specific digital data service access automatically implemented in real time.

While not limited to such, illustrative examples are provided herein of a modular, extensible, automated digital data services access management system for carrying out the above-described operations of dynamic assignment of digital data services quality attributed to particular user devices, based on a currently assigned experience band, on a real-time basis in accordance with pre-configured assignment definitions. The system is extensible in that it supports augmentation to add new triggering event message types, user/device/account types, and rules for handling triggering events in order to dynamically process an unlimited variety of events for an unlimited variety of user device/account types and/or statuses.

Turning to FIG. 1, an illustrative mobile wireless network environment is schematically depicted. Such network, provided in greatly simplified form for purposes of avoiding unnecessarily complicating the disclosure, is an example of a type of network to which the disclosed dynamic digital data service level assignment to user devices/accounts may be applied. In the illustrative example, a user device 102 associated with a user account requests digital data services access via a RAN node 104. The access request results in execution of an authentication and access determination operation that includes determining an appropriate device experience band to be assigned to a grant of digital data services access. The resulting assignment of a particular device experience band (see, FIGS. 5 and 6 described herein below) defines limits and/or priority of the user device to digital data services provided by the associated mobile wireless network segment. In the illustrative example, the initial access request is passed to a core network 106 including a home subscriber server (HSS) 108 of known function and configuration that executes, among other things, operations for assigning digital data services access attributes to a connection set up for the user device 102 requesting access to digital data services.

The core network 106 further includes a network operating system 110 comprising network status messaging tools that register changes to operating status of mobile wireless network components (e.g., status of operation and usage of RAN interface nodes) and publish changes to operating status in the form of event messages provided to a dynamic user device digital data services access management system (access management system) 112 described herein.

Additionally, a back-office rating engine 114 (e.g., a business support system (BSS) and/or operating support system (OSS)) provides updated status information for various user devices and associated accounts, in the form of event messages, to the access management system 112.

The access management system 112, in response to the event messages from the aforementioned event messages from the back-office rating engine 114 and the network operating system 110, determines an appropriate experience band for the requesting user device and thereafter applies the assigned experience band to render a digital data services access quality attribute set for the user device. Thereafter, the access management system 112 provides the determined set of digital data service quality attributes, for the user device 102, to the HSS 108. Additionally, the access management system 112, as will be described further herein below, is also configured to initiate providing messages (e.g. text message, email, etc.) to individual user devices notifying users of a triggering event, account status change, and/or a change in network access status arising from the triggering event.

While described in the context of a single user device request, the disclosure herein is directed an infrastructure that is configured to respond to network-originated triggering event messages that results in mass re-allocation service quality attributes (e.g., assigned experience band) for affected user accounts/devices. In particular, the access management system 112 is configured to process triggering event messages affecting potentially massive quantities of mobile wireless accounts and associated devices.

The operation of the access management system 112, responding to triggering event messages, is described by way of detailed illustrative examples provided in the figures and corresponding descriptions thereof provided herein below. In general, the access management system 112 manages the processing of incoming (triggering) event messages provided by either/both the back office rating engine 114 (responding to changes in one or more user account statuses) and the network operating tools 110 (responding to network events). The access management system 112 processes the received event messages, resulting in changes to user experience band assignments to one or more user accounts. The access management system 112 thereafter initiates publication of user profile assignments (see FIG. 5) in accordance with the new user experience band assignments for the one or more user accounts by appropriate messaging to the HSS 108. Additionally, in association with the resulting new user experience band assignment, the access management system 112 may also issue appropriate messages (e.g., text message, email, etc.) to affected users/devices. Subsequent user device requests are handled according to the newly assigned device experience bands and corresponding network profiles stored in the HSS 108 in accordance with the directions of the access management system 112 arising from processing the event messages.

Figure 2A:
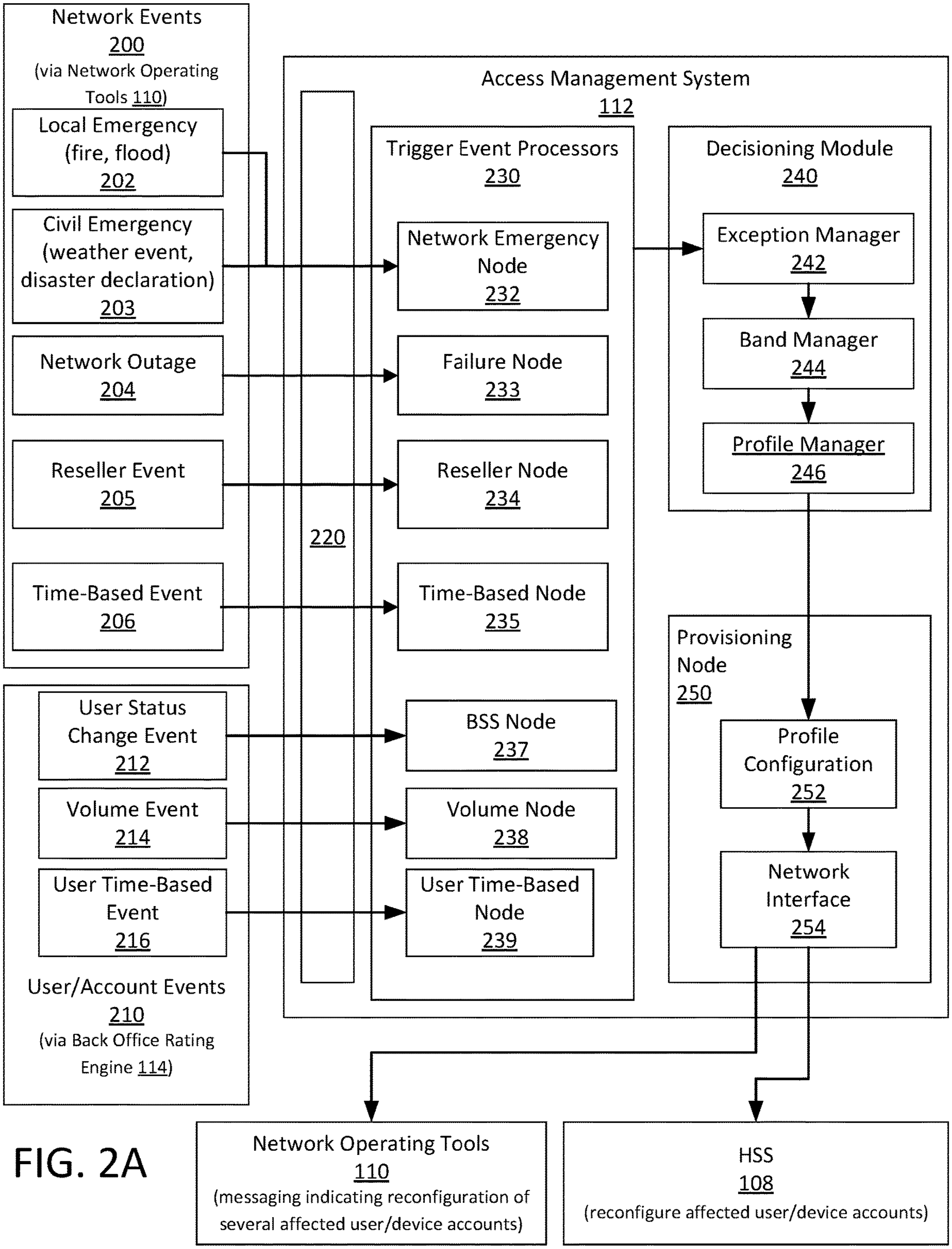
FIG. 2A is a detailed schematic diagram of an exemplary message flow between components of a system in accordance with the current disclosure.

Turning to FIG. 2A, an exemplary message flow between the above-discussed mobile wireless network environment components is summarized in accordance with the current disclosure. As indicated in FIG. 2A, triggering event messages may originate from any of a vast variety of sources, and are provided in a message data payload in accordance with a predetermined messaging format (see FIG. 2B) for initial reception/handling by an event manager 220 containing extensible routing logic configured to examine parameters (e.g. event type, event source, etc.) in received triggering event messages (any of an extensible set of supported message types) and route the received triggering event message to an appropriate one of an extensible set of trigger event processors 230 for handling each of the supported set of event message types. In accordance with an illustrative example of the present disclosure, each triggering event message presented to the access management system 112 corresponds to (i.e., identifies) a single user account. However, in alternative illustrative examples, the triggering event messages are received by the access management system 112 with a group identifier (or other manner of identifying multiple affected accounts/user devices). In such case, an event message pre-processing node (not shown in FIG. 2A) may be provided that digests the group definition to render a plurality of individual account-specific triggering event messages handled by the event manager 220.

Figure 2B:
FIG. 2B is an exemplary message structure for defining a triggering message received and processed by an event manager of the access management system.

Turning briefly to FIG. 2B, an exemplary data payload in triggering event messages received by the event manager 220 includes: an event type (used to route the triggering event message to a corresponding processor node of the trigger event processors 230); a subscriber identifier (indicating affected user/account); trigger event source (e.g., billing system, network); triggering node (e.g., unique node identifier); and date/time stamp. The provided example of data payload in a triggering event message is provided for exemplary purposes, and the combination of data payload fields will vary in accordance with alternative implementations of the presently disclosed system and method of operating the disclosed system.

In accordance with the illustrative example provided in FIG. 2A, the access management system 112 receives, via the network operating tools 110, network events 200 triggering event messages. The network events 200 include, by way of example, a local emergency event 202 (e.g., a fire, flood, etc. in a localized geographic area), a civil emergency event 203 (e.g., a weather event, disaster declaration covering a wide area), a network outage event 204, a reseller event 205, and a time-based event 206. The above-identified event types are, for the most part, self-explanatory. The reseller event 205 specifies a temporary change in service level extended by a mobile wireless data services reseller for identified accounts/user devices (e.g., a temporary increase in allocated digital data volume). The time-based event 206 specifies a temporary usage change and includes a duration (e.g., a specified start/end date and time), a geographic location, and an account customer type designation. As such the time-based event may be configured and deployed by the network to accommodate an expected increase in user device population in a particular geographic area (e.g., high volume during a sporting event at a stadium).

Additionally, the access management system 112 receives, via the back office rating engine 114 (comprising a BSS and/or OSS), user/account events 210. The user/account events 210 include, by way of example, a user account status change event 212, a user account volume limit event 214, and a user time-based event 216. A change in user/account event may arise from an account services request moving an identified account type (e.g. account group) to a higher (or lower) tier mobile wireless plan. By way of example, instances of the user account status change event 212 may arise from a promotional offer giving a selected user a temporarily higher quality of service, an account being in default for failure to pay a monthly subscription fee, etc. Instances of the user account volume limit event 214 arise from a user/account reaching a data allocation limit (e.g., monthly data allocation)—resulting in a degradation of service level until a next billing cycle (or other digital data allocation reloading event). In accordance with the present disclosure, the user time-based event 216 is created when a specific temporary usage change is desired for a specific date and time for a specified user account (without regard to geographic location of the user/device associated with the identified account). Importantly, the access management system 112 receives sufficient information associated with a given event (see e.g., FIG. 2B described herein above)—whether a network event or user/account event—to apply automated decision logic and render a resulting user experience band change and thereafter execute appropriate message generation for assigning a new profile status to affected user accounts.

In accordance with an illustrative example, the event manager 220 is an event message receiver and router configured with extensible decision logic incorporating routing rules for forwarding initially received event message data payload contained in a received triggering event message to one of the extensible set of specialized processor nodes of the trigger event processors 230.

In the illustrative example of FIG. 2A, the event manager 220 is configured to receive network event messages of any of the identified network event message types identified herein above, and route the received network events to a corresponding specialized network event processor node of the trigger event processors 230. In the illustrative example, the set of network event processor nodes of the trigger event processors 230 includes: a network emergency node 232 for processing local emergency 202 and civil emergency 203 event messages; a failure node 233 for processing network outage 204 event messages; a reseller node 234 for processing reseller event messages; and a time-based node 235 for processing time-based events (e.g., a local sporting event resulting in substantial changes to usage patterns at particular network RAN interfaces).

In the illustrative example of FIG. 2A, the event manager 220 is configured to receive user/account event messages of any of the identified user/account event message type identified herein above, and route the received user/account event messages to a corresponding specialized account event processor node of the trigger event processors 230. In the illustrative example, the set of user/account event processor nodes includes: a BSS node 237 for processing account change events for identified users/accounts; a volume node 238 for processing a data volume exceeded event for a particular user account (e.g., a user has exceeded an allocation of 5 Gigabytes of roaming data usage at a high user experience band level resulting in moving the user account to a lower user experience band); and a user time-based node 239 that operates to process time-limited modifications for user accounts that will expire after a specified time and the account will revert to a previous status/user experience band.

Importantly, the event manager 220 and the trigger event processors 230, in accordance with an extensibility aspect of the present disclosure, are reconfigurable in that they are capable of incorporating additional routing/handling logic to route/process new types of triggering event message types. Thus, in accordance with illustrative an example, for a new event message type of the network events 200 or the user account events 210 the event manager 220 is augmented with added logic for recognizing the new triggering event message type and routing the data payload of the received event message of the new event message type to a new event processor node (not shown) of the trigger event processors 230 for handling the new triggering event type. Illustrative examples of operation of particular ones of the trigger event processors 230 are provided herein below with reference to FIGS. 3 and 4.

Figure 2C:
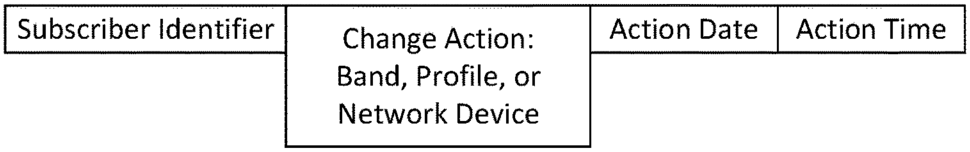
FIG. 2C is an exemplary message structure for defining responsive action message action provided by triggering event processors to a decisioning module of the access management system.

The output rendered by each of the trigger event processors 230 is an executable action message comprising a set of fields summarized, by way of an illustrative example, in FIG. 2C. In that regard, the exemplary executable action message includes: a subscriber identifier (identifying one or more user/device accounts to which a designated experience band reassignment will be applied resulting in a modified network profile for affected users/accounts); a change action (e.g., change to an experience band/profile of a user/device account or multiple accounts currently associated with an identified network element such as a RAN node); an action date; and an action time.

With continued reference to FIG. 2A, the access management system 112 includes a decisioning module 240 configured to receive, from the trigger event processors 230, an executable action message (generated by one of the extensible set of event processors) containing a data payload (see e.g., FIG. 2C) describing a responsive action to be initiated/carried out by the access management system 112 to reconfigure one or more user/device accounts (e.g., reassign to a specified experience band). More particularly, an exception manager 242 applies additional logic to decide whether an exception condition is present that would prevent the access management system 112 from carrying out an action specified in the received executable action message received from the trigger event processors 230. If an exception condition is not present, the change action is propagated to an experience band manager 244.

In accordance with an illustrative example, the experience band manager 244 assigns a new experience band to an identified user/device in accordance with a stored relationship between particular identified device profiles and corresponding network profiles. Each assigned experience band specifies a set of parameter values identifies various levels of network access under various network access types for a device assigned the particular experience band. An example stored structure for maintaining a set of experience bands is provided in FIG. 6.

Referring briefly to FIG. 6, each one of the six identified rows (groups A through E) corresponds to a distinct one of six (exemplary) experience bands. Each row includes: a device profile and a network profile. The device profile is a combination of a group identifier and an experience band identifier. The network profile contains a set of descriptor parameters identifying access for each of a set of network access types. In the illustrative example, a special access type specifies whether or not 5G access is available; "on network" specifies three levels of access (Base, Type 1, and Type 2) for on network access; "off network" specifies three levels of access (Base, Type 1, and Type 2) for off-network/roaming access; and "hotspot" specifies two types of access (Base and Type 1) for Hotspot access support by the device. Thus, in accordance with the illustrative example, the access management system 112 operates to dynamically, in real time, establish a new experience band identifier for an affected user/device. Where the new experience band specifies access levels (e.g. N0, N1, N2, R0, R1, R2, H0, H1, etc.) for various types of network access by the affected user/device at potentially multiple condition-based levels (e.g., base level, data volume threshold 1 reached, data volume threshold 2 released) for each of the various network access types.

Thus, in accordance with the illustrative examples provided herein, device experience bands are assigned to various subscription configurations (identified users/devices) and can be specialized for specific user types. For example, a particular group of users/devices are identified as "first responders" and will be automatically assigned to experience bands providing higher data access service quality in accordance with a public emergency network event trigger message received by the access management system 112.

The changes to experience band assignments for the affected user/device are propagated to a profile manager 246 that applies the access level parameter values to a table (see FIG. 5) relating access levels (e.g. N0, N1, N2, R0, R1, R2, H0, H1, etc.) to quality of service supported for particular types of network access (e.g., upload, download, video granularity, roaming access, hotspot access, etc.).

Figure 2D:
FIG. 2D is an exemplary message structure for defining a provisioning action message provided by the decisioning module to the provisioning node of the access management system.

With continued reference to FIG. 2A, the changes to network segment profiles for an identified user/device are propagated from the decisioning module 240 to a provisioning node 250 including a profile configuration 252 that is updated in accordance with the new profile for the identified user/device rendered by the decisioning module 240. An exemplary data payload in provisioning messages provided by the decisioning module 240 to the provisioning node 250 is provided in FIG. 2D. In the illustrative example, the provisioning message includes: a provisioning action (describing re-configured access levels for network access); subscription identifier of an affected user/device; an action date, and an action time (that the change will take effect in the target network segment). Thereafter, the changes to the affected user/device profiles (in accordance with the reassigned/new experience band) are propagated to the HSS 108 (for application of the new user/device profile-defined network access) and network operating tools 110 (e.g. directions to issue text/email messages to affected users).

Figure 3:
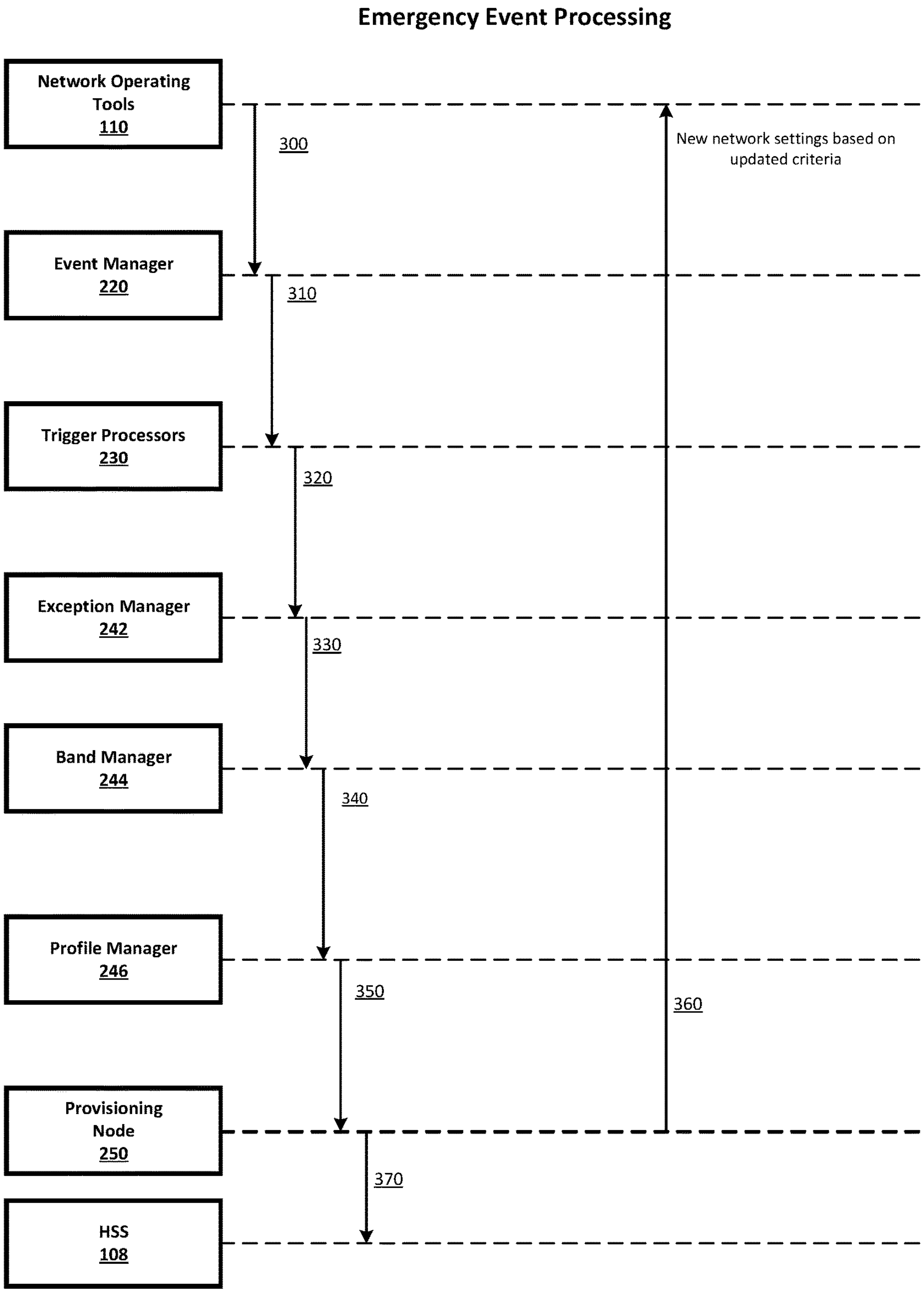
FIG. 3 is a sequence diagram summarizing operations for an exemplary processing of a received emergency triggering event message in accordance with the disclosure.

Turning to FIG. 3, a sequence diagram summarizes operations for an exemplary processing of a received emergency triggering event message (for a single user/subscriber) in accordance with the disclosure.

300: The network operating tools detect an expected/actual emergency circumstance in a specified geographic region/area which affects specific network segments that results in performance degradation of the mobile wireless network infrastructure located therein (e.g., significant damage to RAN interface nodes due to a weather event such as a tornado). In accordance with detecting the weather emergency, the network operating tools 110 generate an instance of the civil emergency 203 event (see FIG. 2B) and submit the instance of the civil emergency event 203 the access management system 112 for reception/processing by the event manager 220. In accordance with the illustrative example, the network operating tools 110 generate/submit thousands of instances of the emergency event 203 to the event manager 220. Each such instance corresponds to a user/account identified as having an association (e.g. a zip code) in the affected geographic region/area

310: The event manager 220 identifies (based upon a specified "type" of the received event message per FIG. 2B) the network emergency node 232 as the appropriate trigger processor node, of the set of trigger event processors 230, to handle the received civil emergency event 203 instance and forwards a notification message, corresponding to the received civil emergency event 203, to the network emergency node 232.

320: The network emergency node 232 processes the received instance of the civil emergency event 203 from the event manager 220, and renders an action message including a prescribed action on an identified user/device account (see FIG. 2C) to the exception manager 242.

330: The exception manager 242 processes the prescribed action of the received action message by applying a universal listing of rules that potentially override/modify the prescribed action on the identified account (e.g., a white list identifying subscribers for which service/user experience is never degraded, geographic areas having low user density and therefore not requiring degradation of service/experience level). Thereafter, the exception manager 242 conditionally (e.g., not passes on a prescribed action message in the event that a criterion for blocking the prescribed action applies) passes the potentially overridden action to the band manager 244. By way of example, the exception manager 242 may over-ride a degradation action based upon an identified subscriber being in a listing of first responders (e.g., local fire/police) for which degradation (e.g., data rate throttling) is never imposed.

340: The band manager 244 executes the received prescribed action on the identified user/account identification. By way of example, the identified subscriber is assigned to a new user experience band (see FIG. 6) in accordance with the prescribed action.

350: The profile manager 246, in accordance with a new experience band to which an identified subscriber is now assigned, updates a network profile description (see FIG. 5) and passes a provisioning message (see FIG. 2D) specifying the updated profile description to the provisioning node 250.

360 and 370: The profile configuration 252 element, of the provisioning node 250, receives an updated profile for the identified subscriber (e.g., lower downlink data rates that have been degraded to reduce digital data services demand by a non-first responder subscriber during a weather emergency); and the network interface 254 issues reconfiguration instructions/commands, in accordance with the updated profile (e.g., degraded downlink data rate) of the identified subscriber/account, to the HSS 108 and the network operating tools 110 to incorporate/implement the new/updated profile of the identified subscriber/account in the physical components managing user experience of the identified subscriber/account in a mobile wireless network.

Figure 4:
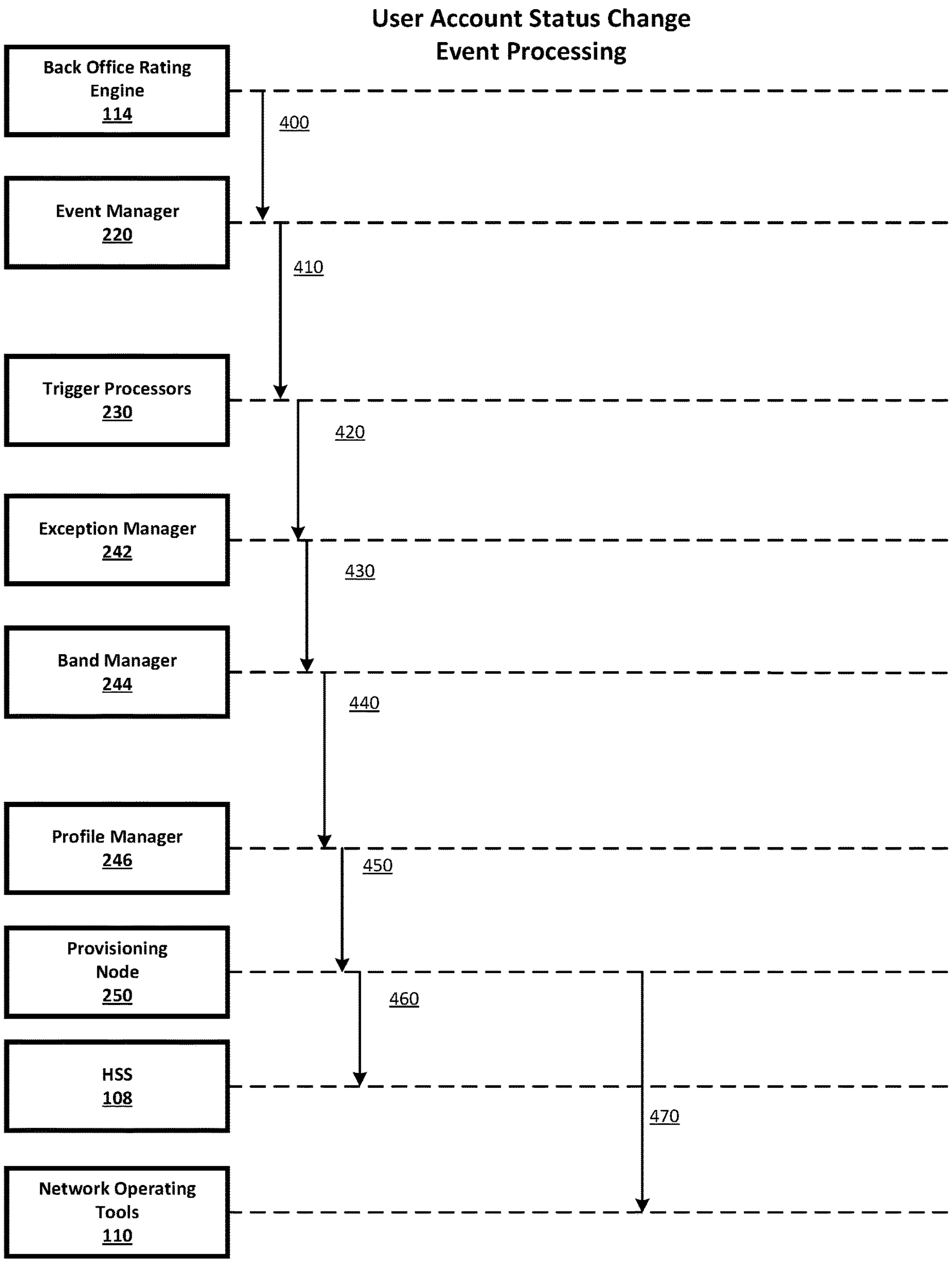
FIG. 4 is a sequence diagram summarizing operations for an exemplary processing of a received user account status change triggering event message in accordance with the disclosure.

Turning to FIG. 4, a sequence diagram summarizes operations for an exemplary processing of a received user account status change triggering event message in accordance with the disclosure. By way of example, a subscriber reaches a digital data services usage threshold (e.g. 10 Gbytes) limit prior to the end of the subscriber/account billing cycle (prior to billing cycle reset).

400: The back office rating engine 114 generates and issues an instance of the volume event 214, identifying a user/device that has exceeded a data volume limit, to the event manager 220. The message includes, for example, subscriber information and the "volume" event type.

410: The event manager 220 identifies (based upon a specified "type" of the received event message per FIG. 2B) the volume node 239 as the appropriate one, of the trigger event processors 230, to handle the received volume event 214 instance, and forwards a notification message to the volume node 239.

420: The volume node 239 processes the data payload (e.g., volume limit reached description and an identified user/subscriber/account) of the received instance of the volume event from the event manager 220, and renders an action message including a prescribed action (e.g., degrading network services) on an identified user/device account (see FIG. 2C) for transmission to the to the exception manager 242.

430: The exception manager 242 processes the prescribed action of the received action message by applying a universal listing of rules that potentially override/modify the prescribed action on the identified account (e.g., a white list identifying subscribers for which service/user experience is never degraded, subscribers with a higher risk of churn). Thereafter, the exception manager 242 conditionally (e.g., not passing on a prescribed action message in the event that a criterion for blocking the prescribed action applies) passes the potentially overridden action to the band manager 244. By way of example, the exception manager 242 may over-ride a degradation action based upon an identified subscriber being in a listing of whitelisted or high churn risk users for which data limits, while indicated, are not applied. In such case, the processing of the received instance of the volume event 214 ceases, without any change to the identified subscriber's assigned user experience band and corresponding network profile.

440: The band manager 244 executes the received prescribed action on the identified user/account identification. By way of example, the identified subscriber is assigned to a new (lower) user experience band (see FIG. 6) in accordance with the prescribed action. 450: The profile manager 246, in accordance with a new experience band to which an identified subscriber is now assigned, updates a network profile description (see FIG. 5) and passes a provisioning message (see FIG. 2D) specifying the updated profile description to the provisioning node 250.

460 and 470: The profile configuration 252 element, of the provisioning node 250, receives an updated profile for the identified subscriber (e.g., lower downlink data rates that have been degraded in accordance with the new/lower user experience band to which the identified subscriber has been assigned); and the network interface 254 issues reconfiguration instructions/commands, in accordance with the updated profile (e.g., degraded downlink data rate) of the identified subscriber/account, to the HSS 108 and the network operating tools 110 to incorporate/implement the new/updated profile of the identified subscriber/account in the physical components managing user experience of the identified subscriber/account in a mobile wireless network.

As a result of the operation of the automated steps, an identified subscriber, via automated processes carried out by the identified processing elements, is assigned an updated experience level and resulting throttled data rate. Upon completion of the billing cycle, the user's data allocation is replenished and a further volume event instance is issued to the event manager indicating that the identified subscriber is to be restored to a higher (previous) user experience band providing higher (non-throttled) data rates.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising." "having." "including." and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification is construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method carried out by an extensible access management system for modifying a mobile wireless data network services profile for a subscriber, wherein the access management system includes an event manager and an extensible set of trigger event processors comprising a plurality of processor nodes configured to process particular trigger event types of trigger event instances received by the access management system, and wherein the method includes:

receiving, by an event manager, a triggering event message, wherein the triggering event message specifies:
- a triggering event type, and
- a subscriber identification corresponding to the subscriber;

forwarding, by the event manager in accordance with the triggering event type, an event notification message to a target node of the extensible set of trigger event processors; and rendering by the target node, by processing the event notification message, an action message, wherein the action message specifies:
- a prescribed action, and
- the subscriber identifier; and providing, by a provisioning node in accordance with the prescribed action and subscriber identifier, an updated profile configuration for an account associated with the subscriber identifier for implementation of an access limit placed on digital data services access in accordance with the updated profile configuration.

2. The method of claim 1 further comprising establishing, by a band manager applying the action message to an account configuration corresponding to the subscriber identifier, an updated user experience band associated with the subscriber identifier.

3. The method of claim 2 further comprising establishing, by a profile manager applying the updated user experience band to a network access profile table, the updated profile configuration for the account associated with the subscriber identifier.

4. The method of claim 1 further comprising applying an exception rules definition to the action message to conditionally override the prescribed action on the account associated with the subscriber identifier.

5. The method of claim 1, wherein the providing comprises issuing, to network operating tools, instructions to update network profile configuration associated with the subscriber identifier.

6. The method of claim 1, wherein the providing an updated profile configuration comprising issuing, to a home subscriber server instructions to update an affected account associated with the subscriber identifier.

7. The method of claim 1, wherein the triggering event type is an emergency event type, and wherein the triggering event message identifies a geographic area to which the triggering event message applies.

8. The method of claim 1, wherein the triggering event type is a user account volume event, and wherein the triggering event message indicates that allocated digital data volume has been depleted for an account associated with the subscriber identifier.

9. An extensible access management system for modifying a mobile wireless data network services profile for a subscriber, wherein the extensible access management system includes:

at least one electronic processor element; and a non-transitory computer readable medium including computer executable instructions that, when executed by the at least one electronic processor element, facilitates carrying out a method, by an event manager and an extensible set of trigger event processors comprising a plurality of processor nodes configured to process particular trigger event types of trigger event instances received by the access management system, wherein the method includes:

receiving, by an event manager, a triggering event message, wherein the triggering event message specifies:

a triggering event type, and a subscriber identification corresponding to the subscriber;

forwarding, by the event manager in accordance with the triggering event type, an event notification message to a target node of the extensible set of trigger event processors; and rendering by the target node, by processing the event notification message, an action message, wherein the action message specifies:

a prescribed action, and the subscriber identifier; and providing, by a provisioning node in accordance with the prescribed action and subscriber identifier, an updated profile configuration for an account associated with the subscriber identifier for implementation of an access limit placed on digital data services access in accordance with the updated profile configuration.

10. The extensible access management system of claim 9, wherein the method further comprises establishing, by a band manager applying the action message to an account configuration corresponding to the subscriber identifier, an updated user experience band associated with the subscriber identifier.

11. The extensible access management system of claim 10, wherein the method further comprises establishing, by a profile manager applying the updated user experience band to a network access profile table, the updated profile configuration for the account associated with the subscriber identifier.

12. The extensible access management system of claim 9, wherein the method further comprises applying an exception rules definition to the action message to conditionally override the prescribed action on the account associated with the subscriber identifier.

13. The extensible access management system of claim 9, wherein the providing comprises issuing, to network operating tools, instructions to update network profile configuration associated with the subscriber identifier.

14. The extensible access management system of claim 9, wherein the providing an updated profile configuration comprising issuing, to a home subscriber server instructions to update an affected account associated with the subscriber identifier.

15. The extensible access management system of claim 9, wherein the triggering event type is an emergency event type, and wherein the triggering event message identifies a geographic area to which the triggering event message applies.

16. The extensible access management system of claim 9, wherein the triggering event type is a user account volume event, and wherein the triggering event message indicates that allocated digital data volume has been depleted for an account associated with the subscriber identifier.

* * * * *